United States Patent
Sim et al.

(10) Patent No.: US 11,113,672 B2
(45) Date of Patent: Sep. 7, 2021

(54) COMPUTER SUPPORT FOR MEETINGS

(71) Applicant: Microsoft Technology Licensing, LLC, Redmond, WA (US)

(72) Inventors: Robert Alexander Sim, Bellevue, WA (US); Marcello Mendes Hasegawa, Bothell, WA (US); Ryen William White, Woodinville, WA (US); Mudit Jain, Redmond, WA (US); Tomer Hermelin, Tel-Aviv (IL); Adi Gerzi Rosenthal, Hod Hasharon (IL); Sagi Hilleli, Rishon Lezion (IL)

(*) Notice: Subject to any disclaimer, the term of this patent is extended or adjusted under 35 U.S.C. 154(b) by 146 days.

(21) Appl. No.: 15/933,249

(22) Filed: Mar. 22, 2018

(65) Prior Publication Data
US 2019/0295041 A1 Sep. 26, 2019

(51) Int. Cl.
G06Q 10/00 (2012.01)
G06Q 10/10 (2012.01)
G10L 15/02 (2006.01)
G06N 20/00 (2019.01)
G10L 15/08 (2006.01)

(52) U.S. Cl.
CPC ......... *G06Q 10/1095* (2013.01); *G06N 20/00* (2019.01); *G06Q 10/107* (2013.01); *G10L 15/02* (2013.01); *G10L 2015/025* (2013.01); *G10L 2015/088* (2013.01)

(58) Field of Classification Search
None
See application file for complete search history.

(56) References Cited

U.S. PATENT DOCUMENTS

| | | | | |
|---|---|---|---|---|
| 6,963,841 | B2* | 11/2005 | Handal | G09B 5/04 704/251 |
| 7,280,964 | B2* | 10/2007 | Wilson | G09B 5/04 704/251 |
| 8,533,766 | B2* | 9/2013 | Medina | H04N 7/17336 725/107 |

(Continued)

OTHER PUBLICATIONS

Kim, Joshua, 8 Tips For the Remote People in Mixed On-Site / Virtual Meetings, Nov. 29, 2016, Inside Higher Ed, https://www.insidehighered.com/blogs/technology-and-learning/8-tips-remote-people-mixed-site-virtual-meetings, p. 1-11. (Year: 2016).*

(Continued)

*Primary Examiner* — Joseph M Waesco
(74) *Attorney, Agent, or Firm* — Shook, Hardy & Bacon L.L.P.

(57) ABSTRACT

A system and method to provide computer support for a meeting of invitees comprises accessing one or more sensory data streams providing digitized sensory data responsive to an activity of one or more of the invitees during the meeting, the one or more sensory data streams including at least one audio stream. The method also comprises subjecting the at least one audio stream to phonetic and situational computer modeling to recognize a sequence of words in the audio stream and to assign each word to an invitee, subjecting the sequence of words to semantic computer modeling to recognize a sequence of directives in the sequence of words, and releasing one or more output data streams based on the sequence of directives, the one or more output data streams including one or more notifications.

20 Claims, 7 Drawing Sheets

(56) References Cited

U.S. PATENT DOCUMENTS

| | | | |
|---|---|---|---|
| 8,832,561 B2* | 9/2014 | Nurminen | H04L 12/5692 715/739 |
| 2003/0182111 A1* | 9/2003 | Handal | G09B 5/04 704/231 |
| 2003/0229497 A1* | 12/2003 | Wilson | G09B 19/04 704/270.1 |
| 2007/0198259 A1* | 8/2007 | Karas | H04N 21/2353 704/235 |
| 2012/0253817 A1* | 10/2012 | Trinh | H04M 3/42204 704/270 |
| 2014/0082100 A1* | 3/2014 | Sammon | G06Q 10/109 709/206 |
| 2014/0270141 A1* | 9/2014 | Filonov | H04M 3/51 379/265.07 |
| 2016/0092578 A1* | 3/2016 | Ganani | G06F 16/9535 707/728 |
| 2016/0248910 A1* | 8/2016 | Merrow | H04M 3/5158 |
| 2016/0335572 A1* | 11/2016 | Bennett | G06Q 10/06311 |
| 2016/0337295 A1* | 11/2016 | Bennett | H04L 51/046 |
| 2017/0270930 A1* | 9/2017 | Ozmeral | G10L 17/00 |
| 2017/0372271 A1* | 12/2017 | Goldsmith | H04L 67/22 |

OTHER PUBLICATIONS

"International Search Report and Written Opinion Issued in PCT Application No. PCT/US19/021730", dated Jun. 14, 2019, 19 Pages.

* cited by examiner

COMPUTER SUPPORT FOR MEETINGS

BACKGROUND

In recent years, computer systems have been developed that accept voice input, reply in spoken language, and carry out simple commands. While a computer system may respond adequately to a user's command to play media or initiate a hands-free phone call, for example, the ability to intuit the user's intentions in more complex scenarios remains a significant technical challenge. The challenge is due, in part, to the complex and variable manner in which human beings use language.

SUMMARY

One aspect of this disclosure is directed to a system and method to provide computer support for a meeting of invitees. This method comprises accessing one or more digital data streams providing digital data related to a subject of the meeting, the digital data including one or more of email and document data. The method also comprises subjecting a sequence of words of the digital data to semantic computer modeling to identify one or more agenda items to be discussed during the meeting, assembling the one or more agenda items into a meeting agenda, and transmitting one or more output data streams including the meeting agenda to one or more of the invitees.

Another aspect of this disclosure is directed to a system and method to provide computer support for a meeting of invitees. The method comprises accessing one or more sensory data streams providing digitized sensory data responsive to an activity of one or more of the invitees during the meeting, the one or more sensory data streams including at least one audio stream. The method also comprises subjecting the at least one audio stream to phonetic and situational computer modeling to recognize a sequence of words in the audio stream and to assign each word to an invitee, subjecting the sequence of recognized words to semantic computer modeling to recognize a sequence of directives in the sequence of words, and releasing one or more output data streams based on the sequence of directives, the one or more output data streams including one or more notifications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Meetings are conducted regularly in many organizations, because the exchange of information that occurs during a meeting is believed to increase human productivity. Naturally, for productivity to actually increase, the benefit from the exchange of information must exceed the combined loss of each person's time in preparing for, supporting, and attending the meeting. Persons whose time must be factored in include not only the invitees of a meeting, but also anyone charged with a support task (planning, scheduling, furnishing documents, note-taking, etc.). Thus, in any organization where frequent meetings are necessary but labor costs are high, a significant overhead may be associated with human planning and support for meetings. In view of these issues, the systems and methods disclosed herein provide automated planning and support for a meeting of invitees. This approach employs cutting-edge machine-learning (ML) models to decipher written and spoken human language and leverages modern server-system architectures that make vast bodies of data readily and rapidly accessible to sophisticated computer processing.

Figure 1:
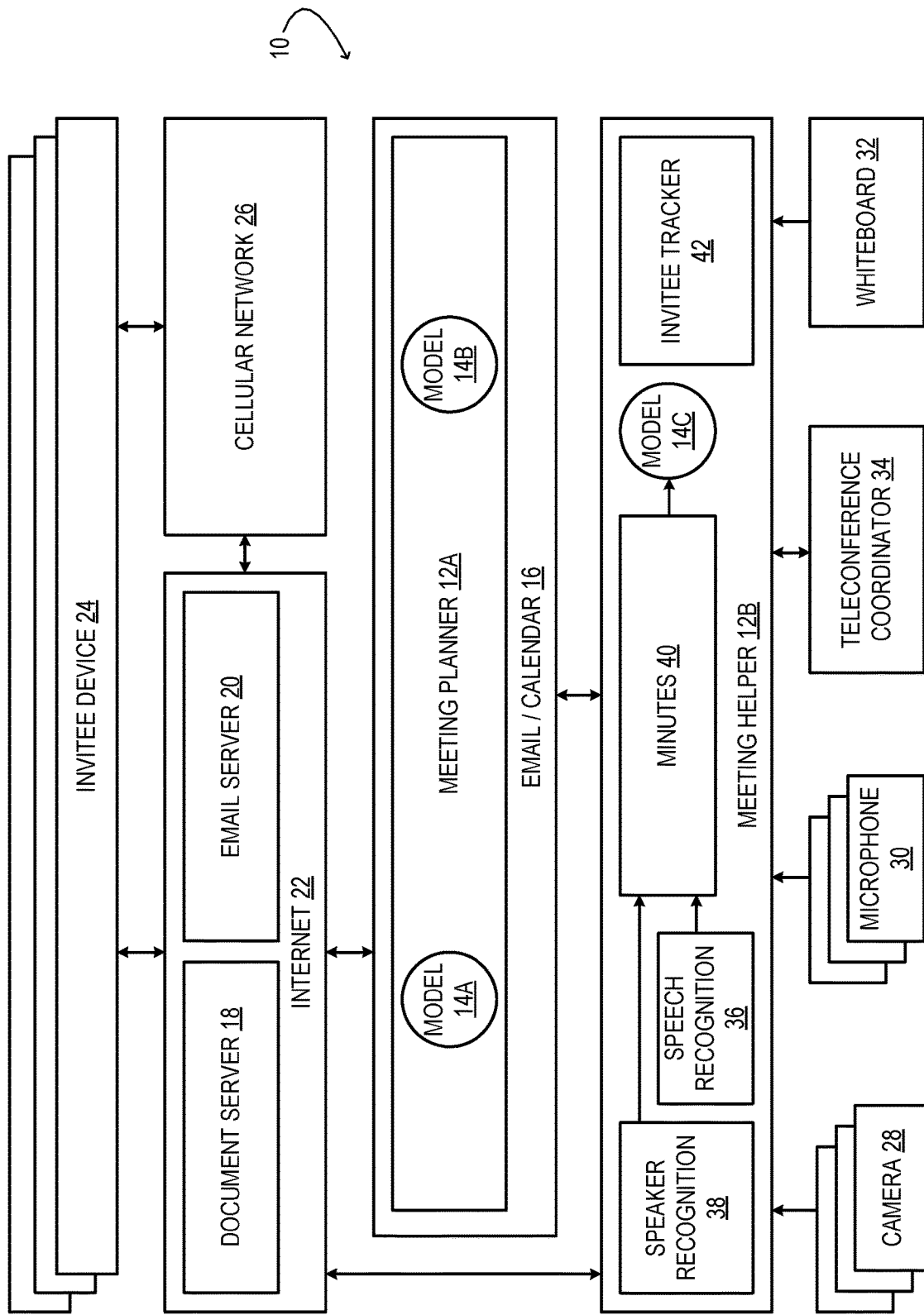
FIG. 1 shows aspects of an example computer-system environment configured to support a meeting of invitees.

Turning now to the drawings, FIG. 1 shows aspects of an example computer-system environment 10 configured to support a meeting of invitees. The computer-system environment includes a meeting planner 12A and a meeting helper 12B. The meeting planner and the meeting helper each embody an automated meeting support system, both individually and in combination.

Meeting planner 12A is a server computer system and associated service configured to provide support to meeting invitees prior to the meeting. The meeting planner includes machine-learning models 14A and 14B configured, respectively, for topic extraction and item ranking, as discussed further below. In the illustrated example, the meeting planner is a component of an email/calendar service 16. In other examples, the meeting planner may be a component of another service or a stand-alone application. Meeting planner 12A is communicatively coupled to a document sever 18 and to an email server 20, each of which is accessible from internet 22. Various invitee devices 24—desktop and laptop computers, wearable devices, and portable devices such as smart phones—also access the internet, in some cases through a cellular network 26. In this manner, the meeting planner may gain access to each invitee's location, and to email and documents authored by the invitees.

Meeting helper 12B is a server computer system and associated service configured to provide support to meeting invitees during the meeting. The meeting helper is configured to receive plural sensory data streams from sensory components arranged in a meeting place. Such components may include cameras 28, microphones 30, whiteboard recorder 32, and teleconference coordinator 34. In some implementations, cameras 28 may be sufficient in number and arranged so as to capture the face of every attendee of the meeting, such that each face may be identified by the speaker-recognition logic. Optionally, at least one of the cameras may be a depth-imaging (e.g., time-of-flight) camera. A depth-imaging camera may be configured to assess the posture of the various attendees of the meeting, for speaker-recognition and other purposes. Microphones 30 may be configured to record the meeting audio directionally, so that every spoken work may be identified with a speaker, based on a known or discoverable seating arrangement among the attendees. Coupled to the various sensory components, the active logic of the meeting helper is made aware of invitee presence, whether within the confines of the physical meeting place, or online via the teleconferencing coordinator.

Meeting helper 12B includes a speech-recognition engine 36 configured to convert the audio from the meeting into a sequence of words of text. To this end, the speech-recognition engine may be trained to recognize phonemes from a broad range of speakers (with different vocal characteristics) and to assemble such phonemes into words of the speakers' lexicon. The meeting helper also includes a speaker-recognition engine 38 configured to associate each of the recognized words to the appropriate attendee of the meeting. Minutes 40 is the work product of the speech- and speaker-recognition engines; it comprises a stored corpus of text, each word of the text associated with the attendee that spoke it. Continuing in FIG. 1, meeting helper includes 12B a machine-learning model 14C configured for action-item classification applied to the minutes, as discussed further below. The meeting helper also includes an invitee tracker 42 configured to receive location data for the various invitees and to track the invitees' locations. Such tracking may be used to determine whether an invitee is present at the meeting or engaged in another activity, and for other purposes, as described herein.

Figure 2:
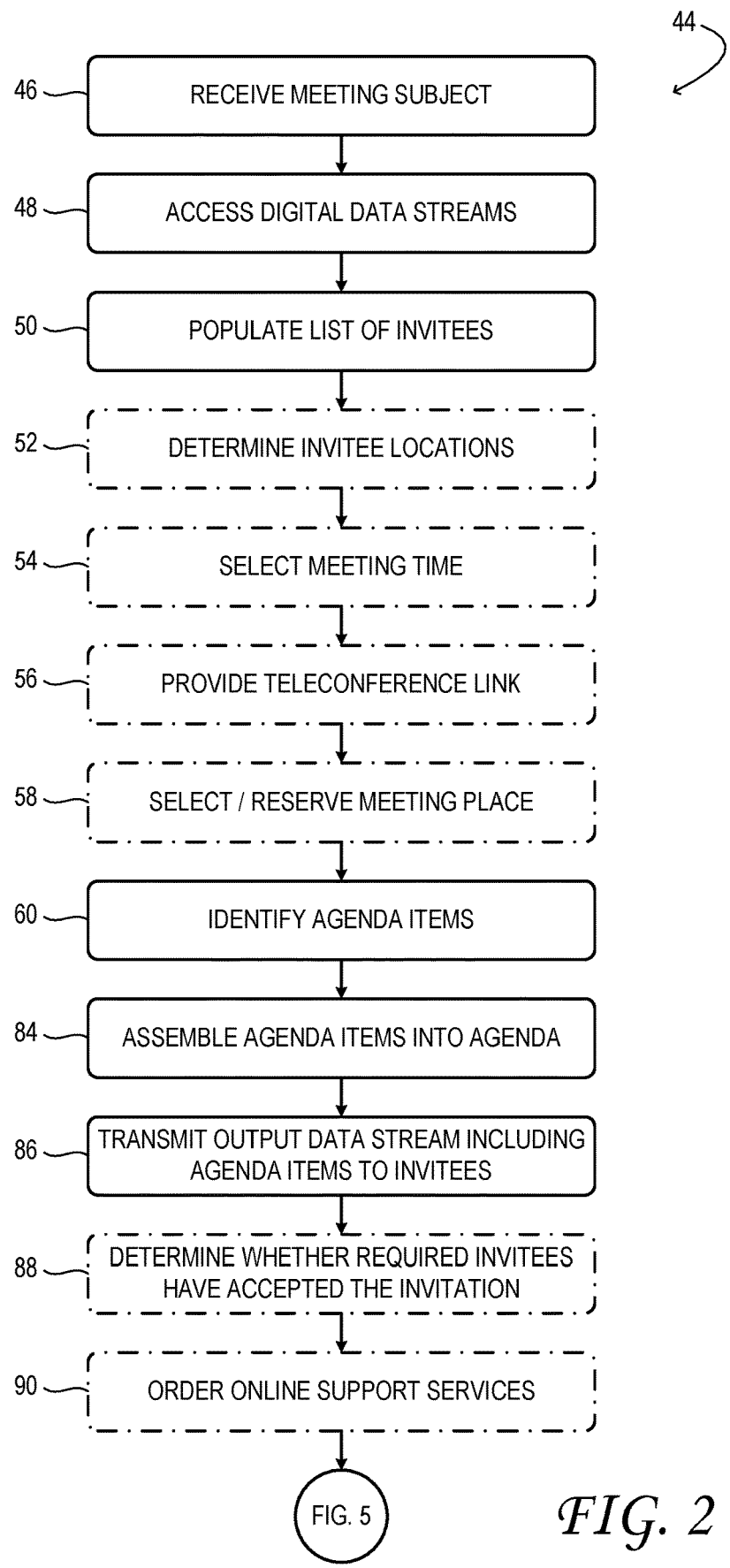
FIG. 2 shows aspects of an example method to provide computer support for a meeting of invitees.

FIG. 2 shows aspects of an example method 44 to provide computer support for a meeting of invitees. The actions shown in dot-dashed blocks are understood to be optional, in the sense that other portions of the method may be enacted without them. Actions 46 through 90 correspond to a pre-meeting phase of method 44. These actions may be executed by a suitably configured meeting planner system 12A, as shown in FIG. 1.

At 46 the meeting planner is made aware of a predetermined subject of the meeting, such as by direct input from a meeting organizer (a human being). Via a suitably configured user interface of email/calendar service 16, for instance, the meeting organizer may enter 'Weekly AI Meeting' into a user-interface (UI) control provided by the email/calendar service, when the option to 'Add a meeting' is selected. 'Weekly AI Meeting' is then identified as the meeting subject. In other examples, the meeting subject may be entered into a UI control of a dedicated browser plug-in, entered via a text file or script, or entered in any other suitable manner.

At 48 the meeting planner accesses one or more digital data streams. The digital data streams may be accessed via a computer network, such as a local-area network (LAN), a virtual private network (VPN), or the internet. Each of the digital data streams accessed by the meeting planner may provide, in advance of the meeting, digital data related to the subject of the meeting. The digital data may include email, documents, and/or other computer objects authored by members of the meeting organizer's organization or of a cooperating organization. The digital data may include email, documents, and/or other computer objects sent to, acquired by, created for, or otherwise associated with such members. As used herein, the term 'document' includes text files, word-processor files, spreadsheets, slide decks, web pages, and e-notes, instant messages, and text-converted voice messages, as examples. The digital data may include, for instance, email, documents, and/or other computer objects authored by attendees of a previous meeting of the same or similar subject. In some examples, the digital data may include minutes from a previous meeting of the same or similar subject. In some examples, email and/or document data received via the one or more digital data streams may be sourced from appropriate network data stores—email and document servers (e.g., Exchange and Sharepoint, respectively, products of Microsoft Corporation of Redmond, Wash., or competing products). Digital data obtained from the network stores may be filtered for relevance to the meeting subject, as described further below.

At 50 the meeting planner populates a proposed list of invitees to the meeting (human beings), based on the subject of the meeting. In particular, one or more invitees may be automatically added or removed from the list based on that invitee's relevance to the indicated subject. The relevance of an invitee to the predetermined subject of the meeting may be quantified in various ways. In one example, a dedicated database may be maintained, which registers the activities, expertise, and/or responsibilities of the members of an organization. A person's relevance may be determined by searching the database for keywords related to the subject. In another example, the organization's store of email, documents, and/or other computer objects may be filtered based on keywords related to the subject. Relevance may then be determined based on how much of the subject-relevant data was authored by or addressed to that person. The list of meeting invitees may also include, in addition to the invitees selected automatically, any person or persons selected by the meeting organizer. The final list may then be submitted to the meeting organizer for revision or approval.

In some examples, the digital data accessed at 48 may include geophysical location data for one or more of the invitees. Such data may be derived from the IP address of a computer used by the invitee, or by a network service accessed by the invitees' cell phones or other portable devices, for example. In other examples the geophysical location data may be derived from an 'intelligent' internet service that analyzes the invitee's travel patterns and recognizes where the invitee's 'home' is. In still other examples, the geophysical location data may be harvested from an online calendar that the invitee shares with his or her organization. At 52, accordingly, the meeting planner determines the geophysical location of each invitee.

At 54 the meeting planner selects an appropriate meeting time based on the range of geographic time zones in which the various invitees are distributed. In particular, a meeting time may be selected so as to fall within normal working hours for all invitees, for most invitees, for one or more key or essential invitees, or (as a courtesy) for invitees associated with a cooperating organization. In some examples, the meeting planner may plan a meeting time so as to avoid conflicts with pre-existing meetings or engagements registered on the invitees' shared calendars.

At 56 the meeting planner provides a teleconference link (e.g., a Skype link, a product of Microsoft Corporation of Redmond, Wash.) for each invitee that may be joining the meeting remotely. The teleconference link may be provided in an email, instant message, or sms message addressed to each of the remote invitees. The teleconference link may also be added automatically to an invitee's shared calendar.

In addition, various actions may be taken on behalf of invitees that will attend the meeting in person. At 58 the meeting planner selects an appropriate meeting place (e.g., conference room) from a networked database of known meeting places. Each meeting place in the database may be associated with an attendee capacity, and with a list of available technology. Thus, a meeting place may be selected based on the expected number of meeting attendees and further based on any technologic requirement for the meeting (e.g., teleconferencing and/or video conferencing devices, whiteboard, projector, round-table device). In some examples, the most appropriate available meeting place may be reserved automatically—via an internet or intranet service. In some examples, such as when the meeting invitees are distributed in two or more geophysical locations, two or more meeting places may be selected. It will be noted that the sequence of actions shown in FIG. 2 may be varied, depending on other factors. In cases where a meeting admits of a great many invitees, for instance, or requires very specialized technology, the meeting place may be selected before the meeting time is determined. Then, the meeting time may be determined based on the availability of the meeting place.

The digital data that the meeting planner accesses at 48 may include text represented in various digital formats—ASCII or unicode text, HTML, XML, and/or binary data readily translatable into text. As such, the digital data may encode a sequence of words of a human language. At 60 of method 44, the meeting planner subjects the sequence of words of the text to semantic computer modeling, one object of which is to suggest one or more agenda items to be discussed during the meeting. A stored email, for example, may contain the text, 'When you see David next week, please let him know that we want to discuss his predicate-logic project at the next AI meeting.' In this example, the agenda item implied in the text may be recognized by topic extraction, document similarity, and/or related techniques. The agenda item 'David—predicate logic' may be extracted in this manner. Although the above example refers to email as the source of the text to be analyzed, various other types of digital document data may be used as well. For example, if the organization maintains a store of its members' white-papers, slide decks, pre-prints, and/or e-notes on a document server, those objects also may be mined for agenda items.

In some examples, agenda items may be recognized based on explicit associations, such as the content of a meeting invitation (e.g., subject line, message body, attachments, file and web links). In other examples, agenda items may be inferred from the standing agenda of a recurring meeting, from open action items identified in a previous meeting, or from explicit declarations in communication, such as 'Let's discuss the sales figures in our meeting this week'. In still other examples, agenda items may be recognized based on associations bridged by the various invitees to the meeting (e.g., in documents authored by or in discussion threads involving one or more of the invitees). For instance, if Nigel is invited to the AI meeting, and if most of Nigel's recent email and/or slide decks concern anaphora resolution, then the meeting planner may automatically propose 'Nigel—update on anaphora resolution' as an agenda item. After initial extraction, the proposed agenda items may be ranked based on relevance to the indicated subject of the meeting. Thus, if the subject of the meeting is AI (artificial intelligence), then items related primarily to AI may be ranked more highly than items that only mention AI, or discuss AI and various other topics in parallel. The rank of a given candidate item may also depend on any suitable metric of importance or urgency. Examples include whether that item has an explicit association with the meeting, whether it has generated significant (or contentious) conversation in the organization's email or messaging, and whether it reflects recently edited and/or shared documents and active work items of the invitees.

Figure 3:
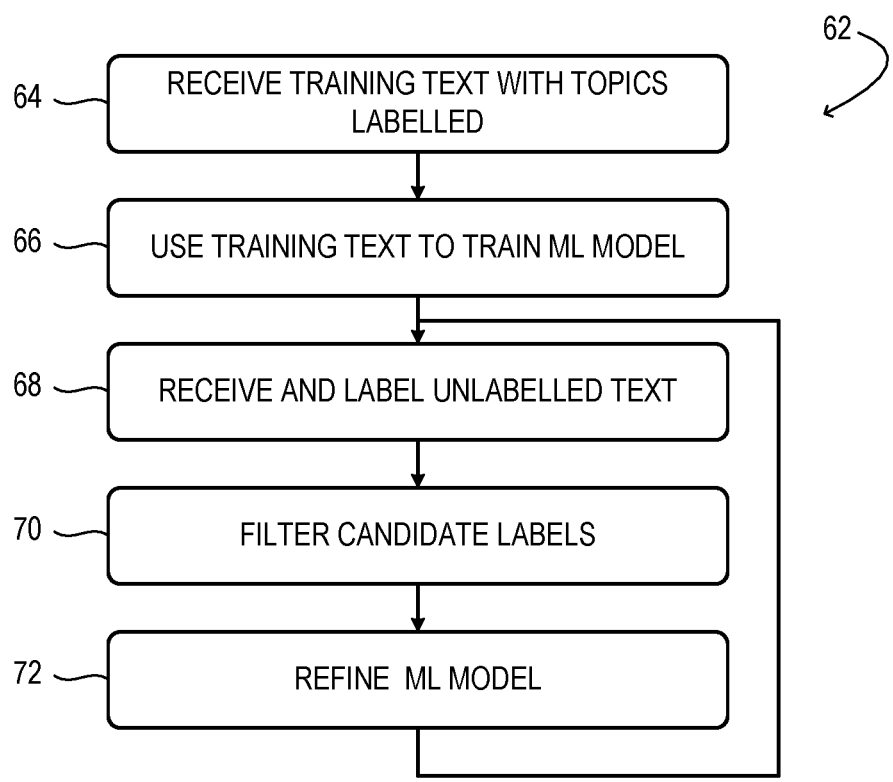
FIG. 3 shows aspects of an example method for identifying relevant meeting-agenda items by topic extraction.

FIG. 3 shows aspects of an example method 62 for creating relevant agenda items by topic extraction. This method may be enacted by meeting planner 12A of FIG. 1 and associated particularly with model 14A. At 64 of method 62, a corpus of training text is received, with various topic labels attached. The topic labels may be previously attached according to human judgment during a supervised training phase. At 66 the training text is used to train a machine-learning (ML) model to the task of topic extraction applied to unlabeled text. Suitable ML variants include Word2Vec, Latent Dirichlet Allocation, and k-Means, as examples. Specifically, a model is trained that converts text into a representation amenable to topic extraction. The representation may include one or more of a 'bag-of-words', a Term Frequency/Inverse Document Frequency, a Word2Vec or Doc2Vec numerical representation, a Latent Dirichlet Allocation, or k-means clusters, as examples. In other implementations, the representation may include one or more embeddings as defined by a feed-forward neural network or a recurrent neural network. For any unlabeled query document, the model produces a probability distribution of identified topics, and the most relevant or several highly relevant topics may thus be associated to the unlabeled document. At 68, therefore, a corpus of unlabeled text is received and labeled according to the trained ML model, but without human supervision. In this manner, the ML model generates a list of candidate labels, each of which corresponds to a possible agenda item for a meeting of a given subject.

At 70 of method 62, the candidate labels may be filtered based on any suitable criteria (e.g., a ranking criterion measuring relevance to the subject). In addition, candidate labels may be grouped based on similarity, or eliminated based on redundancy, so as to generate a concise list of candidate items. At 72 various forms of human feedback may be incorporated (typically without direct human involvement), in order to refine the ML model. For instance, the model may be refined based on knowledge of the agenda items that survive editing by the meeting organizer, or, after the meeting has taken place, based on comparison with the agenda items that were actually discussed (vide infra, this list being compiled and received after a meeting has taken place).

Figure 4:
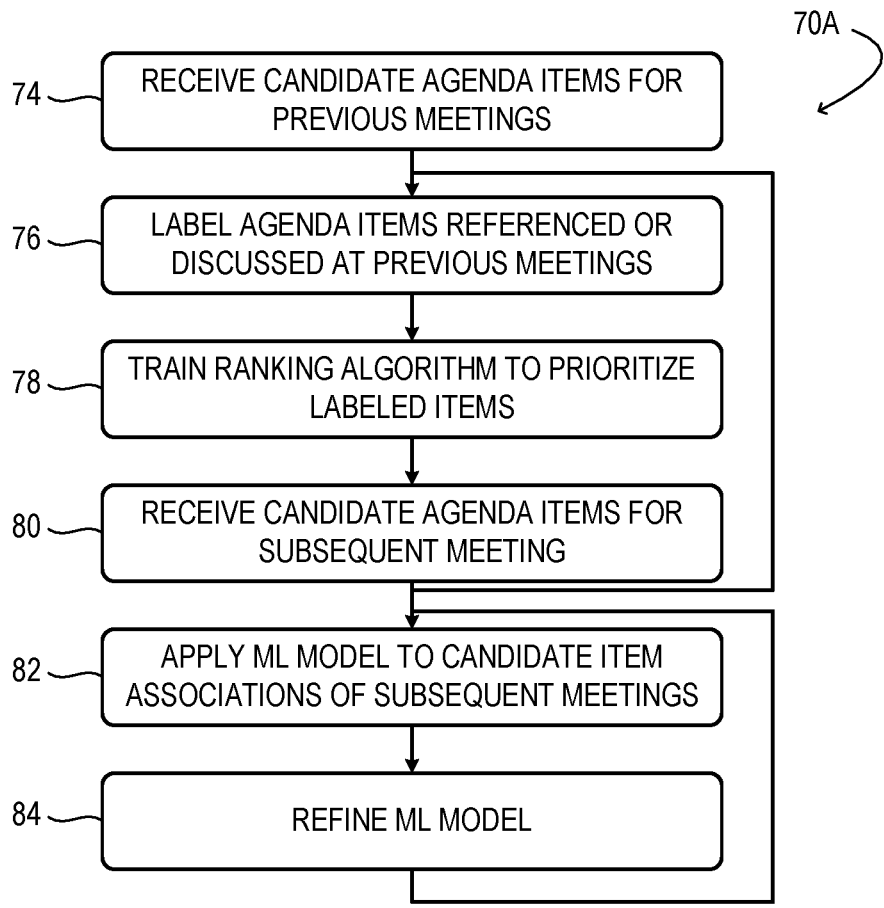
FIG. 4 shows aspects of an example item-ranking method directed to the ranking of candidate meeting-agenda items.

FIG. 4 shows aspects of an example item-ranking method 70A directed to the ranking of candidate agenda items. This method may be enacted by meeting planner 12A of FIG. 1 and associated particularly with model 14B. At 74 of method 70A, a series of candidate agenda items is obtained for one or more previous meetings (e.g., by topic extraction as discussed above). The previous meetings are used to train the ML component of the item-ranking procedure. At 76 the agenda items actually referenced or discussed at the previous meetings are labeled (e.g., by topic extraction and subsequent item association applied to the minutes of the previous meetings). At 78 an ML ranking model is now trained to prioritize the items so labeled. Specifically, an ML ranking model trainer is provided with examples of positive associations (items that were labeled as referenced in previous meetings) and negative associations (items that were not referenced), and a ranking model is trained to rank items as more or less relevant, given a meeting subject. Ranking may be contingent on features extracted from candidate items, including natural language features (ngrams, word embeddings, neural network activations, etc.) and non-language features such as time stamps, reference counts in conversation or emails, and other features that may be indicative of relevance to a meeting subject. The ranking trainer may employ any suitable algorithm developed for ranking in information retrieval. At 80 the trained ranking model may then be applied to the task of ranking candidate agenda items for subsequent meetings. As in the example of FIG. 3, human feedback may be used to refine, at 82, the ML component of the item-ranking procedure, to better match a human-edited agenda or to match the topics actually discussed, as revealed in the minutes after the meeting has taken place.

Returning now to FIG. 2, at 84 of method 44, one or more agenda items selected and prioritized according to the above procedures are assembled into a meeting agenda for transmission to the meeting invitees. Here the one or more agenda items of the meeting agenda may be interpreted to identify any 'open task' which is the responsibility of one or more of the invitees. This interpretation step may be enacted based on a natural language model capable of receiving an agenda item and determining whether any open task is expressed or implied therein. For example, the natural language model may receive the item 'Brainstorm about unicode conversion' and determine that no open task is associated with that particular item. However, upon receiving the item 'Nigel—update on anaphora resolution', the natural language model may determine that the invitee Nigel is charged with updating the group on his anaphora resolution work. In some cases, the meeting planner may be able to assign a task to an invitee based on the *nexus* between the subject matter of that task and the invitee most relevant to that subject matter.

At 86 one or more output data streams including the meeting agenda is transmitted to one or more of the invitees—by email, for example, or added to a calendar item, project-management service, or ToDo list. This action may include alerting each invitee of any open task assigned to that invitee, and following up, optionally, with reminders. At 88 it is determined, via access to the email server, whether each of the required invitees has accepted the meeting invitation; follow-up reminders to attend the meeting may be provided as needed—e.g., for invitees that fail to accept the meeting invitation. At 90 one or more support services may be ordered online for the support of the invitees. Support services may include travel to and from the meeting location, catering, etc. In some examples, the support services may include accessibility accommodations for invitees with a disability or impairment. These and other specificalities may be registered on a shared personal profile of each of the invitees (e.g., an email/calendar profile) and accessed by the meeting planner along with the invitees' contact information and location data, for instance).

In some examples, the actions of the pre-meeting phase of support method 44 may be implemented as features of an online calendar application or service (e.g., Outlook, a product of Microsoft Corporation of Redmond, Wash., or a competing product), which may be extended to provide the necessary ML functions, to issue the required notifications, and to offer the required teleconference links. Alternatively or in addition, actions that require manipulation of a significant volume of data may be implemented via a separate computer application or service that automates data manipulation, and may optionally inform the meeting organizer of the progress thereof.

Figure 5:
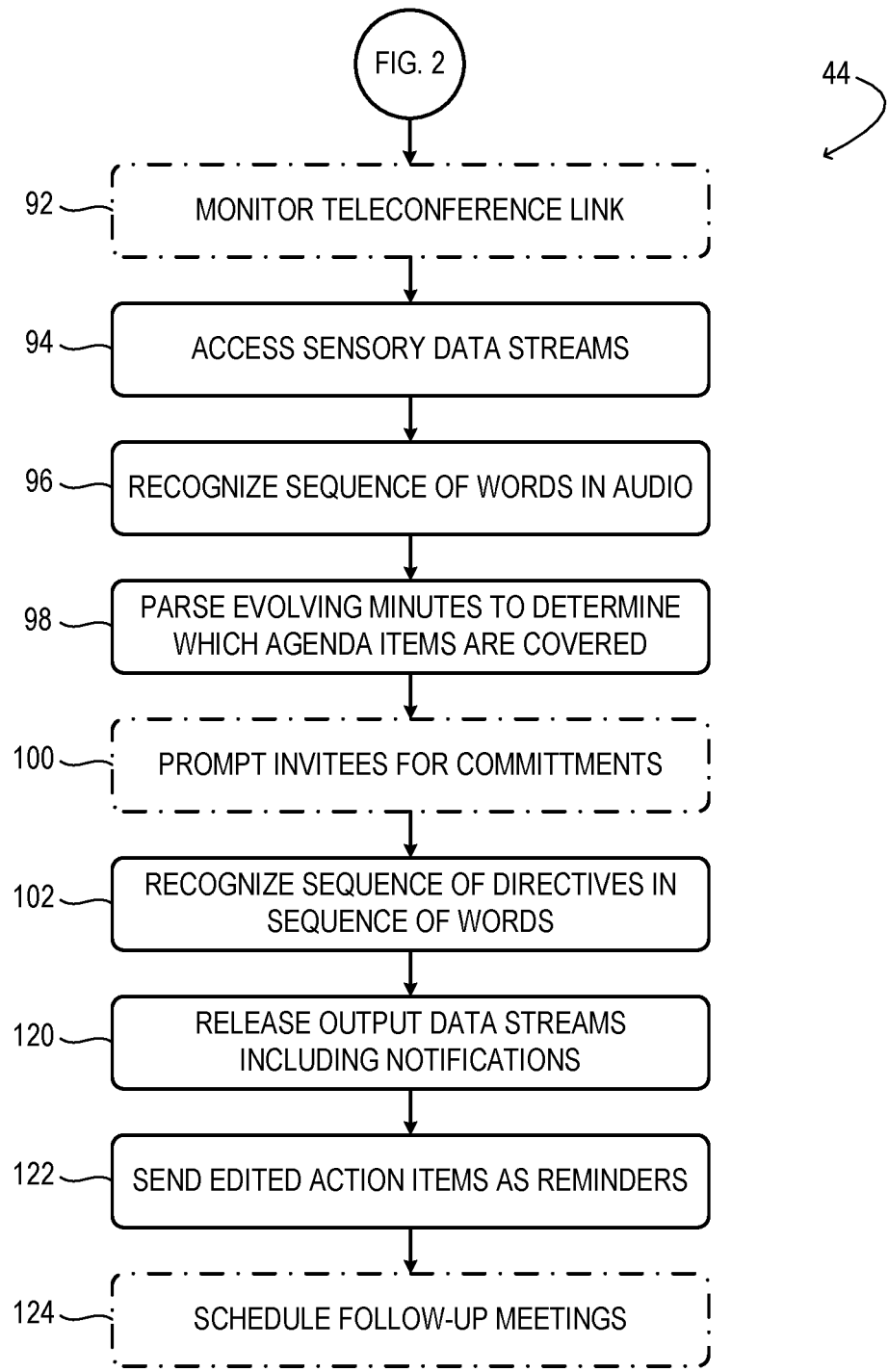
FIG. 5 shows additional aspects of an example method to provide computer support for a meeting of invitees.

FIG. 5 shows additional aspects of computer-support method 44. Steps 92 through 102 correspond to a meeting-time phase of the method. These actions may be executed by meeting helper 12B, as shown in FIG. 1.

At 92 the meeting helper monitors the teleconference link that was provided at 56 to determine which of the remote invitees are currently attending. Optionally, the sensory componentry (cameras, microphones, etc.) at the meeting place(s) may be monitored also, to determine which of the local invitees are currently attending.

Here, the invitees assembled at a meeting place may be alerted (via instant messaging, for example) whether any remote invitee is already attending via the teleconference link. This functionality may be extended in various ways. For example, each invitee to the meeting may be apprised of whether any other invitee is attending. In this way, the attendees may be better able to protect their conversation from adventitious listeners. In some examples, meeting helper 12B may be coupled operatively to meeting planner 12A, such that the data acquired by one service may be shared with the other. For example, certain inferences based on the geophysical location of the various invitees, as gathered by the meeting planner, may be shared with the meeting helper and used for in-meeting support, such as to provide timely and location-specific reminders to any remote attendee that is not yet in attendance at the scheduled meeting time.

At 94 the meeting helper accesses one or more sensory data streams from peripheral sensor componentry (e.g., cameras 28, microphones 30) or from the network. As noted above, the sensory data streams provide digitized sensory data responsive to an activity of one or more of the invitees during the meeting. Relevant activities of the invitees include speaking, gesturing, moving about, drawing on a whiteboard, etc.

In subsequent portions of method 44, the one or more sensory data streams are processed to yield intermediate (or hidden) data that reflects the evolving state of the meeting. The intermediate data, in turn, is further processed to yield one or more output data streams carrying digital output data of various forms. Typically, the digital output data may take the form of a notification to one or more invitees of the meeting, to another person, or to a messaging or workflow service, as described further below.

One example notification that may be transmitted to an invitee based on the evolving meeting state is a reminder to attend the meeting. For instance, if an invitee is not in the meeting place at the start of the meeting (as revealed by tracking of his or her geophysical location), nor logged into the meeting via an associated teleconference line, then that invitee may be issued an automated reminder to attend the meeting. In some scenarios, however, the tardy invitee's location history may reveal that she is en route to the meeting place; a notification to that effect may then be transmitted to the meeting organizer. Moreover, detailed knowledge of the evolving meeting state may be used to notify a tardy invitee that that the meeting has adjourned (or will be adjourning) early. In that event, the invitee knows that he or she need not hurry to attend. These and other personal notifications may be transmitted as email, an sms message, an instant message, etc.

This functionality can be extended in various ways. For example, the meeting helper may be configured to adjust the urgency of the notification depending on the activity in which the tardy invitee is engaged. An invitee that is stationary and not participating in any other meeting may receive the most urgent notification. This may include a pop-up instant message on his or her computer screen, and if that should fail, an sms message to be followed some time later by a message to another to personally remind the invitee. If the invitee is in motion (e.g., driving), however, a less urgent schedule of notifications may be used, such as a single sms message. Finally, if the invitee is engaged in another meeting, notifications may be suppressed until the other meeting has adjourned.

Generally speaking, the one or more sensory data streams accessed at 94 will include at least one audio stream furnishing recorded audio from the meeting. The sensory data may also include video recorded at the meeting place(s), whiteboard imagery recorded at the meeting place(s), in addition to geophysical location data for one or more of the invitees. At 96 of method 44, the meeting helper subjects the audio stream to phonetic and situational computer modeling, in order to recognize a sequence of words in the audio stream and to assign each word to an invitee. This task may be accomplished using state-of-the-art speech recognition applied in combination with suitable speaker recognition. The speech recognition may rely on phoneme recognition, but rather than being trained on a specific speaker, a broad range of speakers of varied dialect and/or vocal characteristics may be incorporated into the training set. In other examples, different models may be trained using different groups of speakers (differing in dialect and/or vocal characteristics) and then applied each to an appropriate group of invitees. Optionally, the sequence of recognized words may be post-processed to remove or substitute instances of disfluency, such as non-lexical utterances ('umm', 'ah', etc).

In some examples, speaker recognition may be based on comparing certain phonemes of the recorded audio against stored voiceprints of the various invitees. In other examples, a correlated video stream from the meeting place may be used to recognize the speaker, by way of the image data carried in the video stream. For example, the video may resolve motion of the mouth of the speaker that correlates to the sound of the speaker's voice. In other examples, the relative posture of the speaker and of the listeners (as revealed by depth imaging, for example) may provide a heuristic indication of who is speaking. Plural listeners, for instance, will typically face the speaker. Directional microphony may also be used for speaker recognition. In addition, speaker recognition may be accomplished through explicit association with individual audio channels, for instance those supplied by users who are connected to a teleconferencing system, or, for those users wearing personal microphones (such as in a meeting involving a presenter in an auditorium).

At 98 the meeting helper parses the evolving minutes of the meeting in real time to determine which of the predetermined agenda items has been discussed. To this end, meeting helper 12B may receive the meeting agenda from meeting planner 12A in advance of the meeting. Then, based on the sequence of words obtained from the minutes, the meeting planner may label each agenda item as 'discussed' or 'not discussed'. In some examples, the minutes may be analyzed directly—e.g., without prior featurization or classification. In other examples, the minutes may be featurized prior to analysis. More specifically, a classification model may accept as input the raw sequence of words (or characters) from the minutes, or, may be configured to accept transformations of the minutes, which extract various useful features. For instance, the features may encode consecutive word pairs (e.g., bi-grams, or one or more Boolean indicators representing that a semantically important phrasing has been spoken (e.g., "we'll discuss . . . "). In still other examples, appropriate transformation of the language stream may project the word sequence into a mathematical space, such as a word embedding. These and other examples of so-called 'natural language classification' may be employed at this stage of method 44.

As adjournment nears, based on the scheduled duration of the meeting, if it is determined that an agenda item has not been discussed then the meeting helper may issue a notification alerting one or more of the invitees to that condition. A notification may also issue to alert the invitees of the time remaining before adjournment, of the range of agenda items discussed or not discussed, etc. At 100, at a short time (e.g., 15 minutes) from the scheduled time of adjournment, the meeting helper may prompt the invitees to commit to one or more action items. Naturally, any commitment spoken by an attendee (with or without prompting) would be captured in the minutes of the meeting—e.g., [Dennis says] 'I would be happy to pick the client up and take him to dinner. Send me a reminder with his flight info.' The commitments contained within the minutes may be recognized in subsequent steps of method 44, along with any other type of directive or action item.

Continuing in FIG. 5, actions 102 through 124 correspond to a post-meeting phase of computer-support method 44. At 102 the meeting helper subjects the sequence of recognized words to semantic computer modeling to recognize a sequence of directives, each recognized directive being associated with an invitee or other individual. In the illustrated method, this step is enacted on the closed minutes of the meeting, after the meeting has adjourned. In other examples, the semantic computer modeling may be enacted on the evolving minutes of the meeting. In general, action items and other directives contained in the minutes may be recognized according to a classification method, as described below. The recognized directives may include personal directives to be enacted by an invitee and/or system directives directed to the computer system executing this portion of method 44. System directives may include instructions that the meeting helper is configured to execute without human assistance—e.g., 'Email a copy of Derek's whitepaper to all invitees', or 'Arrange a follow-up meeting for next week'. Personal directives may include action items of various kinds—e.g., 'Ian to organize roll-out of the beta', 'Jeanine to update the localization fork'. Personal directives may also include commitments—i.e., directives pronounced by the responsible invitee herself. Personal directives may then be communicated to the responsible invitee via a notification (vide infra).

Figure 6:
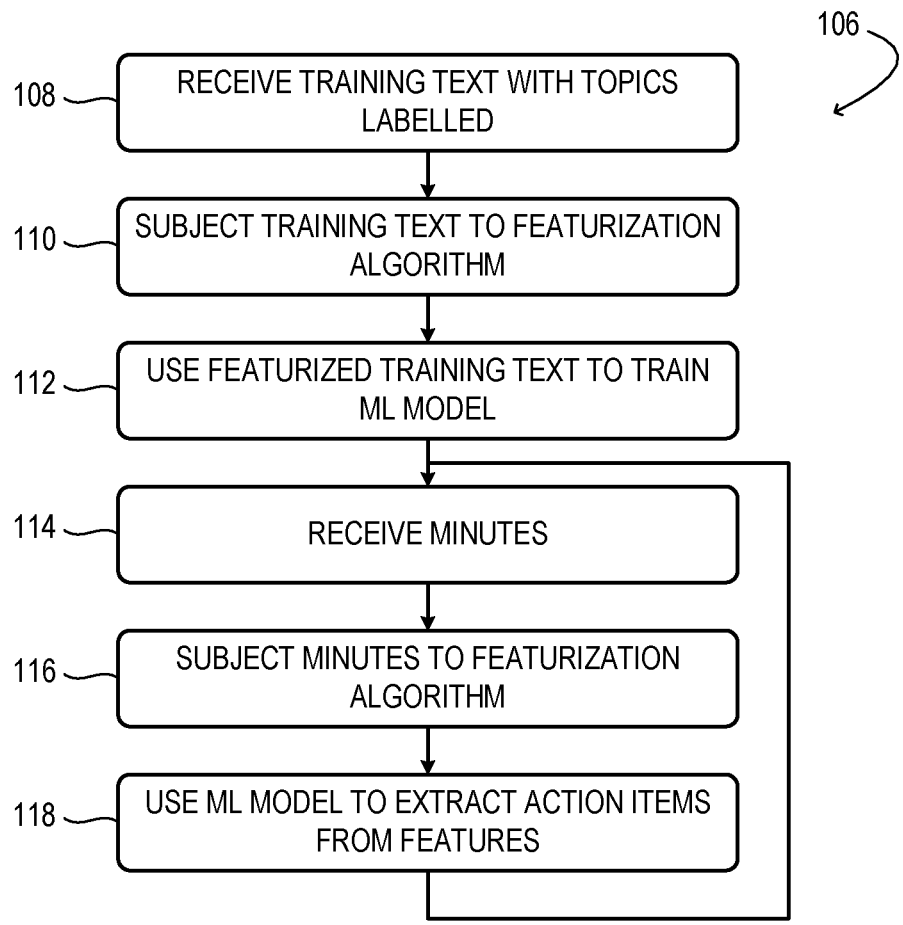
FIG. 6 shows aspects of an example action-item classification method.

FIG. 6 shows aspects of an example action-item classification method 106. At 108 of method 106, a corpus of training text is received, with various action-item labels attached according to human judgment during a supervised training stage and/or via on or more unsupervised training stages. The training corpus may be sourced from previous meetings, or from other communication modes where directives are common (for instance, email conversation). At 110 the meeting helper subjects the training text to a featurization algorithm. In some examples, the specific form of featurization enacted may follow the description given above in the context of step 98. In other examples, the featurization may include ngrams, skip-grams, and additional embedding formats. Some of the additional embedding formats may conform to the input layer of a neural network, or state captures obtained from a recurrent neural network. At 112 the features so obtained are used to train an ML model to the task of action-item classification. After training, the ML model is applied to an unlabeled, featurized corpus of text—viz., text derived from the minutes of a meeting. At 114, therefore, unlabeled meeting minutes are received and subjected to sentence processing, followed by the featurization algorithm, at 116, to generate a list of features based on the minutes. Then, at 118 the trained action-item model is applied to extract action items from the features. In some examples, the same ML model trained to recognize action items (i.e., personal directives) may also be used to recognize commitments and system directives. In other examples, separate ML models may be trained and used to recognize system directives and/or commitments.

The above description of action-item recognition and associated featurization is not intended to be limiting in any sense. Various extensions of the above concepts are also envisaged. For instance, directive detection may include inference of due dates, whether based on an explicit mention of a deadline, or implicitly, based on detection of an intent to reconvene or schedule a follow-up meeting, or based on an inference of the estimated time required to accomplish the task. Moreover, the features extracted in this method are not necessarily limited to features useful for defining an action item or other directive. Rather, in some examples, features may be extracted to facilitate detection of agreement or acceptance of a directive, or to determine whether a directive was accomplished or revoked during the meeting. This could be a straightforward as recognizing and featurizing a sequence of words said during the meeting by an invitee charged with a particular task: 'I'll be happy to do that,' or conversely, 'No, I don't think so'. Naturally, more complex semantic variants are also envisaged.

Returning now to FIG. 5, at 120 the meeting helper releases one or more output data streams based on the series of action items so obtained. The one or more output data streams may include the series of action items in the form of one or more notifications. In some examples, notifications of action items harvested from a meeting may be conveyed to task tracking software—e.g., an invitee or other individual's ToDo list, or the organization's work-item tracker. Examples of suitable work-item trackers include Team Foundation Services (a product of Microsoft Corporation of Redmond, Wash.) or JIRA (a product of Atlassian Corporation of Sydney, Australia). In effect, a 'notification' of an action item may be transmitted to such software instead of, or in addition to, the responsible individual. In other examples, notifications of action items harvested from a meeting may be issued to a responsible individual, directly or indirectly, via any available communication mechanism. Suitable mechanisms include email, sms, instant messaging, etc. More particularly, the meeting helper may associate any recognized directive with a specific individual, based on verbal ownership claims or verbal assignments, based on topic relevance, or falling back to the meeting organizer when no relevant recipient can be identified. It will be noted that notification recipients are not necessarily limited to the list of meeting invitees, but may also include other persons and/or computer services. In some examples, the various action items identified from the closed minutes may be submitted first to the meeting organizer (or to another invitee), for approval and/or editing. Then, at 122 the action items (edited, optionally) may be distributed as notifications or reminders to the invitees responsible for enacting them, and/or to the appropriate work-item tracker.

At 124 a follow-up meeting may be scheduled as needed, including a repeat meeting to accommodate invitees that were unable to attend the current meeting. This scenario again demonstrates the advantage of cooperativity between meeting planner 12A and meeting helper 12B. More specifically, the meeting helper may analyze the minutes and associate the phrase 'Let's reconvene next Tuesday' with a system directive. That system directive may be passed back to the meeting helper, resulting in the scheduling of a Tuesday meeting with the same subject as the current meeting. However, if such a meeting is already scheduled (e.g., it is a regular, recurring meting), then the meeting helper may interpret the same phrase not as a system directive, but as a personal directive (i.e., action item to the current attendees), simply requiring them to attend. Naturally, the meeting helper may be configured to suppress redundant action items to the same invitee.

In some examples, the automatically generated, closed minutes from the meeting—and/or additional notes captured by one or more of the invitees—may be shared with other invitees, or with non-invitees, via one or more communication channels. In this manner, selected items from the minutes may be offered from a central archive for future reference.

In some examples, the actions of the post-meeting phase of support method 44 may be implemented as features of an online calendar application or service, which is extended to provide the necessary ML functions, issue the required notifications, and offer the required teleconference links for future meetings. Alternatively, these actions may be implemented as a feature of another online service, or by any suitable stand-alone application or service.

No aspect of the drawings or description herein should be interpreted in a limiting sense, for numerous variations, extensions, and omissions are envisaged as well. For example, many of the actions represented in the above methods are optional. Although method 44 is described as a comprehensive process—with meeting-time, pre-meeting, and post-meeting phases—any of these phases, or actions thereof, may instead be enacted independently. Moreover, many of the components and constructs of meeting-support environment 10 are also optional.

Figure 7:
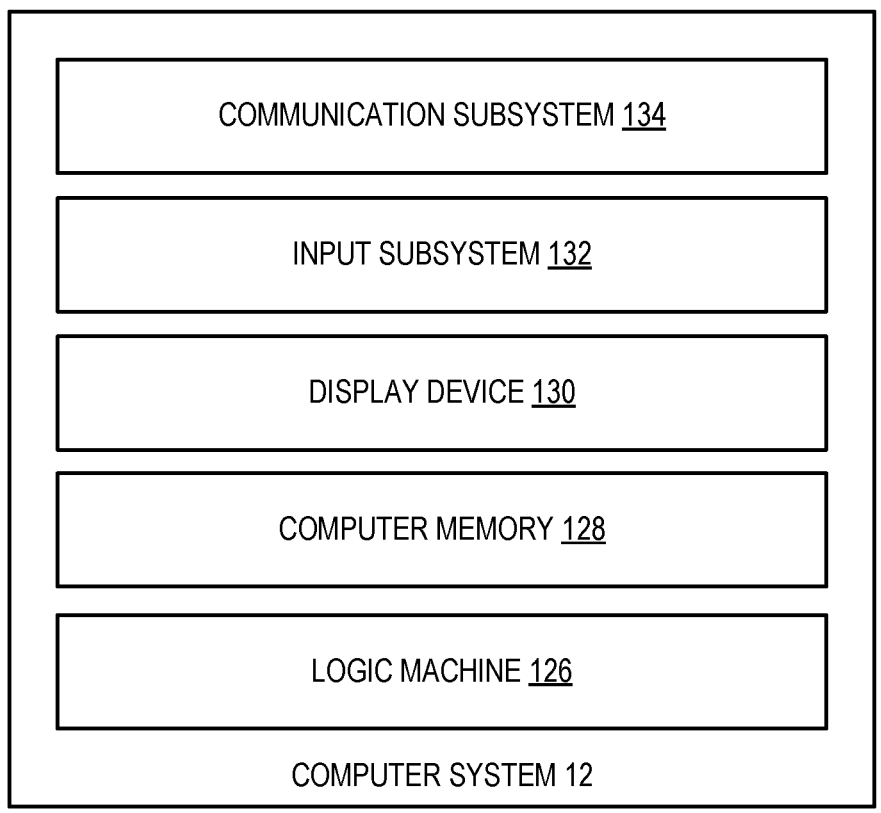
FIG. 7 shows aspects of an example computer system.

FIG. 7 schematically shows a non-limiting embodiment of a computer system 12 that can enact one or more of the methods and processes described above. Computer system 12 is shown in simplified form. Computer system 12 may take the form of one or more personal computers, server computers, tablet computers, network computing devices, mobile computing devices, mobile communication devices (e.g., smart phone), and/or other computing devices. In some examples, computer system 12 may be embodied as meeting planner 12A or as meeting helper 12B.

Computer system 12 includes a logic machine 126 and associated computer memory 128. Computer system 12 may optionally include a display device 130, input device 132, network device 134, and/or other components not shown in FIG. 7.

Logic machine 126 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 126 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Computer memory 128 includes one or more physical devices configured to hold instructions executable by the logic machine to implement the methods and processes described herein. When such methods and processes are implemented, the state of computer memory 128 may be transformed—e.g., to hold different data.

Computer memory 128 may include removable and/or built-in devices. Computer memory 128 may include optical memory (e.g., CD, DVD, HD-DVD, Blu-Ray Disc, etc.), semiconductor memory (e.g., RAM, ROM, EPROM, EEPROM, etc.), and/or magnetic memory (e.g., hard-disk drive, tape drive, MRAM, etc.), among others. Computer memory 128 may include volatile, nonvolatile, dynamic, static, read/write, read-only, random-access, sequential-access, location-addressable, file-addressable, and/or content-addressable devices.

It will be appreciated that computer memory 128 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 126 and computer memory 128 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module,' 'program,' and 'engine' may be used to describe an aspect of computer system 12 implemented to perform a particular function. In some cases, a module, program, or engine may be instantiated via logic machine 126 executing instructions held by computer memory 128. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms 'module,' 'program,' and 'engine' may encompass individual or groups of executable files, data files, libraries, drivers, scripts, database records, etc.

It will be appreciated that a 'service', as used herein, is an application program executable across multiple user sessions. A service may be available to one or more system components, programs, and/or other services. In some implementations, a service may run on one or more server-computing devices.

When included, display device 130 may be used to present a visual representation of data held by computer memory 128. This visual representation may take the form of a graphical user interface (GUI). As the herein described methods and processes change the data held by the computer memory, and thus transform the state of the computer memory, the state of display device 130 may likewise be transformed to visually represent changes in the underlying data. Display device 130 may include one or more display components utilizing virtually any type of technology. Such display components may be combined with logic machine 126 and/or computer memory 128 in a shared enclosure, or such display devices may be peripheral display devices.

When included, input device 132 may comprise or interface with one or more user-input components such as a keyboard, mouse, or touch screen. In some embodiments, the input device may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, network device 134 may be configured to communicatively couple computer system 12 with one or more other computing devices. Network device 134 may include wired and/or wireless communication components compatible with one or more different communication protocols. As non-limiting examples, the network device may be configured for communication via a wireless telephone network, or a wired or wireless local- or wide-area network. In some embodiments, the network device may allow computer system 12 to send and/or receive messages to and/or from other devices via a network such as the Internet.

One aspect of this disclosure is directed to a method to provide computer support for a meeting of invitees. The method comprises: accessing one or more sensory data streams providing digitized sensory data responsive to an activity of one or more of the invitees during the meeting, the one or more sensory data streams including at least one audio stream; subjecting the at least one audio stream to phonetic and situational computer modeling to recognize a sequence of words in the audio stream and to assign each word to an invitee; subjecting the sequence of words to semantic computer modeling to recognize a sequence of directives in the sequence of words, each directive associated with an invitee or other individual; and releasing one or more output data streams based on the sequence of directives, the one or more output data streams including one or more notifications.

In some implementations, releasing the one or more output data streams includes submitting the sequence of directives to a meeting organizer for editing and subsequent distribution to one or more of the invitees. In some implementations, recognizing the sequence of directives includes applying a featurization algorithm to the sequence of words, and wherein the featurization algorithm is configured to recognize one or more of a directive, acceptance of a directive, and revocation of a directive. In some implementations, recognizing the sequence of directives includes classification via a trained machine-learning model. In some implementations, the one or more sensory data streams includes at least one video stream, and each word is assigned to an invitee further based on image data from the video stream. In some implementations, the sequence of directives includes a personal directive to be enacted by an invitee. In some implementations, the one or more sensory data streams includes data revealing geophysical location of an invitee. In some implementations, the sequence of directives includes a personal directive to an invitee to remind the invitee to attend the meeting. In some implementations, the one or more output data streams include an email or sms stream through which the notification is issued.

Another aspect of this disclosure is directed to a method to provide computer support for a meeting of invitees. This method comprises: accessing one or more digital data streams providing, in advance of the meeting, digital data related to a subject of the meeting, the digital data including one or more of email and document data; subjecting a sequence of words of the digital data to semantic computer modeling to identify one or more agenda items to be discussed during the meeting; assembling the one or more agenda items into a meeting agenda; and transmitting one or more output data streams including the meeting agenda to one or more of the invitees.

In some implementations, the semantic computer modeling includes topic extraction via a trained machine-learning model. In some implementations, the trained machine-learning model is configured to convert text into a representation amenable to topic extraction. In some implementations, the semantic computer modeling includes ranking of one or more topics extracted from the digital data via a trained machine-learning model. In some implementations, the method further comprises receiving a list of topics actually discussed during the meeting and refining the trained machine-learning model based on the list of topics.

Another aspect of this disclosure is directed to an automated meeting-support system, comprising: a processor; a network device operatively coupled to the processor; and computer memory operatively coupled to the processor and configured to hold program instructions executable by the processor. The program instructions comprise: instructions to access one or more sensory data streams providing digitized sensory data responsive to an activity of one or more invitees during the meeting, the one or more sensory data streams including at least one audio stream, instructions to subject the at least one audio stream to phonetic and situational computer modeling to recognize a sequence of words in the audio stream and to assign each word to an invitee, instructions to subject the sequence of words to semantic computer modeling to recognize a sequence of directives in the sequence of words, and instructions to release, via the network device, one or more output data streams based on the sequence of directives, the one or more output data streams including one or more notifications.

In some implementations, the program instructions further comprise instructions to receive a plurality of agenda items and to determine, based on the sequence of words, which agenda items have been discussed at the meeting. In some implementations, the program instructions further comprise instructions to prompt the one or more invitees during the meeting for commitments. In some implementations, the program instructions further comprise instructions to track a geophysical location of an invitee and to issue a notification via the one or more output data streams when the invitee is late for the meeting. In some implementations, the instructions to release the one or more output data streams specify that the notification is directed to the invitee. In some implementations, the instructions to release the one or more output data streams specify that the notification is directed to an organizer of the meeting.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method to provide computer support for a meeting of invitees, the method comprising:
accessing one or more sensory data streams providing digitized sensory data responsive to an activity of one or more of the invitees during the meeting, the one or more sensory data streams including at least one audio stream and a video stream;
subjecting the at least one audio stream to phonetic and situational computer modeling to recognize a sequence of words in the at least one audio stream;
assigning each word of the sequence of words to an invitee based at least in part on an analysis of image data from the video stream;
subjecting the sequence of words to semantic computer modeling by a machine-learning model to recognize a sequence of directives in the sequence of words, each directive associated with at least one invitee or other individual;
releasing one or more output data streams based on the sequence of directives, the one or more output data streams including one or more notifications comprising a list of directives recognized by the machine-learning model;
receiving an edited list of directives actually discussed during the meeting; and
refining the machine-learning model based on the edited list of directives.

2. The method of claim 1 wherein releasing the one or more output data streams includes submitting the sequence of directives to a user that organized the meeting for editing and subsequent distribution to one or more of the invitees.

3. The method of claim 1 wherein recognizing the sequence of directives includes extracting features from the sequence of words to recognize one or more of a directive, acceptance of a directive, and revocation of a directive.

4. The method of claim 1 wherein recognizing the sequence of directives includes classification via a trained machine-learning model.

5. The method of claim 1 wherein the sequence of directives includes a personal directive to be enacted by a first invitee.

6. The method of claim 1 wherein the one or more sensory data streams includes data revealing geophysical location of a first invitee.

7. The method of claim 1 wherein the sequence of directives includes a personal directive to a first invitee to remind the first invitee to attend the meeting.

8. The method of claim 1 wherein the one or more output data streams include an email or sms stream through which the one or more notifications are issued.

9. An automated meeting-support system comprising:
a processor;
a network device operatively coupled to the processor; and
computer memory operatively coupled to the processor and configured to hold program instructions executable by the processor, the program instructions comprising:
instructions to train a machine-learning model on previous meeting minutes to recognize directives;
instructions to access one or more sensory data streams providing digitized sensory data responsive to an activity of one or more invitees during a meeting, the one or more sensory data streams including at least one audio stream,
instructions to subject the at least one audio stream to phonetic and situational computer modeling to recognize a sequence of words in the at least one audio stream and to assign each word of the sequence of words to an invitee, instructions to subject the sequence of words to semantic computer modeling by the machine-learning model to recognize a sequence of directives in the sequence of words, instructions to release, via the network device, one or more output data streams based on the sequence of directives, the one or more output data streams including one or more notifications comprising a list of directives recognized by the machine-learning model, instructions to receive an edited list of directives actually discussed during the meeting, and instructions to refine the machine-learning model based on the edited list of directives.

10. The system of claim 9 wherein the program instructions further comprise instructions to receive a plurality of agenda items and to determine, based on the sequence of words, which agenda items have been discussed at the meeting.

11. The system of claim 9 wherein the program instructions further comprise instructions to prompt the one or more invitees during the meeting for commitments.

12. The system of claim 9 wherein the program instructions further comprise instructions to track a geophysical location of a first invitee and to issue a notification via the one or more output data streams when the first invitee is late for the meeting.

13. The system of claim 12 wherein the instructions to release the one or more output data streams specify that the notification is directed to the first invitee.

14. The system of claim 12 wherein the instructions to release the one or more output data streams specify that the notification is directed to a user that is an organizer of the meeting.

15. The system of claim 9 wherein the program instructions further comprise instructions to receive a plurality of agenda items and to determine, based on the sequence of words, which agenda items have been discussed at the meeting.

16. One or more memory devices having embodied thereon computer-executable instructions which, when executed by one or more processors, performs a method of providing support for a meeting of invitees, the method comprising:

accessing one or more sensory data streams providing digitized sensory data responsive to an activity of one or more invitees during the meeting, the one or more sensory data streams including at least one audio stream;

subjecting the at least one audio stream to phonetic and situational computer modeling to recognize a sequence of words in the at least one audio stream;

accessing depth images obtained by a depth-imaging camera;

analyzing the depth images to determine relative postures of the invitees;

assigning each word of the sequence of words to an invitee based at least in part on the relative postures of the invitees to associate audio with individual invitees;

subjecting the sequence of words to semantic computer modeling by a machine-learning model to recognize a sequence of directives in the sequence of words;

releasing, via a network device, one or more output data streams based on the sequence of directives, the one or more output data streams including one or more notifications comprising a list of directives recognized by the machine-learning model;

receiving an edited list of directives actually discussed during the meeting; and refining the machine-learning model based on the edited list of directives.

17. The one or more memory devices of claim 16, the method further comprising prompting the one or more invitees during the meeting for commitments.

18. The one or more memory devices of claim 16, the method further comprising tracking a geophysical location of a first invitee and to issue a notification via the one or more output data streams when the first invitee is late for the meeting.

19. The one or more memory devices of claim 18, wherein the notification is directed to the first invitee.

20. The one or more memory devices of claim 18, wherein the notification is directed to a user that is an organizer of the meeting.

* * * * *